United States Patent [19]

Smith

[11] 4,456,447
[45] Jun. 26, 1984

[54] CARRIER WITH EXCHANGEABLE CHUCK

[75] Inventor: Roger D. Smith, Bethel, Ohio

[73] Assignee: Cincinnati Milacron Inc., Cincinnati, Ohio

[21] Appl. No.: 355,224

[22] Filed: Mar. 5, 1982

[51] Int. Cl.³ .................. B29C 17/07; B65G 47/06
[52] U.S. Cl. .................................... 425/182; 198/479;
   198/653; 198/695; 198/696; 264/535; 294/115;
   294/116; 425/526; 425/534; 425/535
[58] Field of Search ............... 425/525, 526, 534, 535,
   425/182; 264/535; 198/377, 378, 479, 653, 695,
   696; 294/115, 116

[56] References Cited

U.S. PATENT DOCUMENTS

| | | | |
|---|---|---|---|
| 3,628,451 | 12/1971 | McClellan et al. | 198/377 X |
| 3,765,533 | 10/1973 | Stephens et al. | 198/378 X |
| 3,944,058 | 3/1976 | Strauss . | |
| 3,958,685 | 5/1976 | McDonald et al. . | |
| 4,055,943 | 11/1977 | Reichert | 294/116 X |
| 4,086,999 | 5/1978 | McDonald . | |
| 4,116,325 | 9/1978 | McDonald . | |
| 4,214,860 | 7/1980 | Kleimenhagen et al. | 425/526 X |
| 4,362,498 | 12/1982 | Harry et al. | 425/526 |

*Primary Examiner*—Jan H. Silbaugh
*Attorney, Agent, or Firm*—Daniel P. Worth; John W. Gregg

[57] ABSTRACT

An article carrier is provided for blow molding equipment which permits relatively simple exchange of the article gripping chuck portion of the carrier. The carrier includes a carrier body, a spindle rotatably supported by the body, an article gripping chuck removeably attached to the spindle and seals between the chuck and the spindle and between the chuck and a preform retained thereby. The chuck is provided with article gripping levers preferably rotatably supported by ball and socket joints. The levers have preform grasping projections at one end and first and second ball ends at the other end. The first ball end mates with the chuck body socket and the second ball end is engaged by a lever actuating ring slidably mounted on the outside of the chuck body.

5 Claims, 5 Drawing Figures (c) an article gripping chuck removeably attached to the spindle for releasably retaining article preforms and having a passage therethrough for admission of the expansion fluid from the spindle, the chuck further including:
  (1) at least two article gripping levers rotatably mounted on the chuck for releasably grasping article preforms by the exterior of the formed portion;
  (2) a lever actuator ring slidably disposed upon the outside of the chuck for imparting rotation to the levers; and
  (3) an actuator ring biasing means connected between the ring and the chuck for holding the actuator at one extreme of its travel to maintain the levers in an article retaining position;
(d) first sealing means for forming a seal between the spindle and the chuck sufficient to withstand the forces of expansion; and
(e) second sealing means for forming a seal between the chuck and the article sufficient to contain the expansion fluid admitted to the article preform.

2. The apparatus of claim 1 wherein the chuck is formed to provide a shield around the exterior of the formed portion of an article preform retained by the chuck.

3. The apparatus of claim 2 wherein the second sealing means further comprises an annular sealing ring disposed within the recess circumscribed by the chuck shield and surrounding the passage therethrough.

4. The apparatus of claim 1 further comprising:
(a) rotation drive means attached to one end of the spindle; and
(b) a chuck mounting flange at the other end of the spindle.

5. The apparatus of claim 4 wherein the first sealing means further comprises an annular sealing ring disposed upon the lower face of the flange and surrounding the passage therethrough.

* * * * *

CARRIER WITH EXCHANGEABLE CHUCK

BACKGROUND OF THE INVENTION

This invention relates generally to article conveying equipment for blow molding machinery. In particular, this invention relates to article carriers for blow molding machinery of the reheat and blow type.

In reheat and blow machinery, thermoplastic article preforms each having a formed portion and a formable portion are loaded into the machine, heated to a molecular orientation temperature, and filled with an expansion fluid to biaxially stretch the formable portion to fill a mold cavity. The resulting finished article is then ejected for collection. The formed portion is left unaltered and is suitable for receiving an article closure device. It is known that to maximize throughput on such machines handling of articles must be minimized. Thus to improve overall processing throughput such machines are configured to provide continuous paths of conveyance from a preform load station to an article eject station, the empty conveyors being returned therefrom to the load station. Applicant has disclosed an article carrier suitable for use throughout such equipment in the copending application Ser. No. 257,468 assigned to the assignee of the present invention now U.S. Pat. No. 4,382,760. The carrier therein disclosed is designed for use in a single lane or conveyance path defined primarily by the construction of the reheat and blow molding sections of the machine. The result is a modular carrier and simplified conveyor drive train. Specifically, the carrier is supported by rollers riding on rails over the horizontal portions of the conveyor path and is pulled therealong by incremental advances of an engaged conveyor chain.

The carrier of the aforementioned application and, in fact, the previously known carriers which convey the articles through reheat and blow equipment by grasping the formed portion of the preforms are limited in application to the design of the formed portion for which they were originally intended. Thus, while the machine may be otherwise readily converted to production of articles having a substantially different design including a different formed portion, the article conveyors would require total replacement or complete rebuilding to accomodate substantial variations in the design of the formed portion. The present invention overcomes this disadvantage while retaining the advantages of the modular design disclosed in the aforesaid copending application.

It is therefore an object of the present invention to provide an article carrier with a rotatable, exchangeable, article gripping chuck for reheat and blow molding equipment.

It is a further object of the present invention to provide an article carrier with a rotatable, exchangeable, article gripping chuck having a passage therethrough to admit the expansion fluid to the article and a seal between the chuck and the article sufficient to contain the expansion fluid.

It is a further object of the present invention to provide an article carrier with a rotatable, exchangeable article gripping chuck having gripping means operative irrespective of the rotation of the chuck within the carrier.

Further objects and advantages of the present invention shall become apparent from the following description.

SUMMARY OF THE INVENTION

In accordance with the aforesaid objects, an article carrier is provided comprising a carrier body, a spindle rotatably mounted in the carrier body, and an article gripping chuck removably attached to the spindle. The chuck is locked to the spindle by set screws. The spindle and chuck are provided with connecting shafts therethrough to admit an expansion fluid to an article preform being held by the chuck. Seals are provided between the spindle and chuck and between the chuck and article to prevent escape of the expansion fluid. The chuck is provided with article gripping levers operable to selectively engage and release the exterior of the formed portion of an article. The levers are operated by movement of an annular ring slidably disposed upon the outside of the chuck and held in the article engaging position by a biasing spring.

BRIEF DESCRIPTION OF THE DRAWINGS

FIG. 1 is a top view of the carrier.

FIG. 2 is a section view through the carrier taken along line 2—2 of FIG. 1.

FIG. 3 is a side view of the carrier taken in the direction of arrow 3 of FIG. 2.

FIG. 4 is a bottom view taken in the direction of arrow 4 of FIG. 2 of a partial breakout showing the arrangement of article gripping levers.

FIG. 5 is a partial breakout in the direction of arrow 5 of FIG. 2 showing the detail of the actuating ring retaining pin.

DESCRIPTION OF THE PREFERRED EMBODIMENT

For purposes of illustrating the invention, an article carrier with a removable rotatably mounted article gripping chuck shall be described in more detail. The particular carrier to be described is one manufactured by Cincinnati Milacron Inc. the assignee of the present invention. This carrier is designed for use in a reheat and blow type molding machine manufactured by the aforesaid assignee.

Referring to FIG. 1, a carrier 10 is seen in top view together with links 106 and 108 (shown in phantom) of the carrier conveying chain. Conveyor chain link pins engage link pin blocks 30 and 32 which are mounted to carrier body 20 by mounting screws 31 and 33, respectively. The carrier body while being conveyed through the molding machine is supported by rollers 22 through 28 seen at the extreme corners of carrier body 20 and which ride upon rails of the machine shown in phantom in FIG. 2. Continuing with reference to FIG. 1, the spindle 40 is seen in its end view within the inner diameter of spindle drive sprocket 50. Engagement of the drive sprocket 50 with spindle 40 is achieved by two opposing splines 54 and 56. Retaining ring 52 is set into a groove in spindle 40 to hold sprocket 50 against motion towards the end of the spindle. During conveyance of article preforms through the heating portion of the machine, sprocket 50 is engaged by a chain to impart rotation to spindle 40 to achieve even heating of the formable portion of an article preform.

Referring now to the section of FIG. 2, the article gripping chuck 60 is seen attached to the lower end of spindle 40 and held in place thereupon by set screw 80.

The lower flange 42 of spindle 40 is provided with a groove 44 therein for receiving the conical ends of set screw 80 and two additional set screws (not shown). Spindle 40 is supported within carrier body 20 by upper bearing 34 and lower bearing 36. Shown in phantom in this figure are the conveying chain links 106 and 108 together with the expansion fluid injection nozzle 100 as it would be seated at the upper end of spindle 40, and a preform 110 including formed portion 112. Additionally, roller support rails 102 and 104 (shown in phantom) are seen supporting rollers 22 and 24 visible in this view.

Continuing with reference to FIG. 2, it can now be appreciated that admission of an expansion fluid to article preform 110 is accomplished from injection nozzle 100 through shaft 46 of spindle 40 and shaft 88 of chuck 60. By providing seals at the appropriate interfaces, the escape of expansion fluid is minimized and the finished article may be successfully blow molded while being retained in carrier 10. Specifically, the injection nozzle 100 carries an annular seal 101 shown in phantom at the mating surface of the top end of spindle 40 and nozzle 100. Further, on the lower surface of flange 42 of spindle 40, a second annular seal 82 is seen in section to create an expansion fluid seal at the mating surface of chuck body 62 and spindle 40. Finally, a third annular seal 90 is mounted on the formed portion receiving recess of chuck body 62 and held in place by retaining ring 91 and mounting screws 92 through 96. These mounting screws and the margin of seal 90 left exposed by retaining ring 91 are seen in the bottom view of FIG. 4. The formed portion 112 of article preform 110 is held in position to compress the seal by the lower ends of the article gripping levers 64 through 68. The arrangement of levers 64 through 68 is seen in the bottom view of FIG. 4.

Referring again to FIG. 2, the section view shows gripping lever 64 being held in the socket 89 of chuck body 62 by its ball end 61. On the opposite end of the upper T-shape of gripping lever 64, a second ball end 63 is shown in engagement with the interior groove of actuating ring 70. As shown, the lower foot of gripping lever 64 is selectively held in engagement with the formed portion 112 by the relative vertical position of actuating ring 70 effecting rotation of the lever around an axis centered at the center of the combination of ball end 61 and socket 89. Actuating ring 70 is held in place in the article engaging position by means of biasing spring 76 being compressed against retaining ring 78. To release an article from the retention of gripping levers 64 through 68, it is only necessary to displace annular ring 70 in the vertical direction as indicated by the phantom lines in FIG. 2. This displacement imparts a rotation of the gripping levers 64 through 68 around their respective ball ends held in the associated sockets of the chuck body 62.

Chuck body 62 is provided with a recess to receive the wall of formed portion 112 to achieve two ends. The chamfered edge of projecting center 86 of chuck body 62 serves to aid in alignment of article preforms being inserted into the carrier at the machine's load station. The effective cupping around projecting center 86 created within the recess by the extension 84 of chuck body 62 serves to shield formed portion 112 from the heat source during conveyance of the preform through the heating section of the machine.

Referring now to FIG. 3, the association of actuating ring 70, biasing spring 76 and spring retaining ring 78 are more clearly revealed. In addition, the interior groove of actuating ring 70 for engaging the outermost upper ball ends of gripping levers 64 through 68 is seen in phantom. Continuing with reference to FIG. 3, it is seen that chuck 60 by virtue of its attachment to flange 42 of spindle 40 is held free from any other connection to carrier assembly 10. By virtue of this construction and keeping in mind that chuck body 62 is held engaged with flange 42 of spindle 40 by means of three set screws, it will be appreciated that when necessary to change the chuck assembly, it is not necessary to remove the carrier from the machine. The entire chuck assembly may be removed from spindle 40 and replaced with another chuck, whether identical to that removed or suitable for accomodating a substantially different design of formed portion of an article preform. Thus, by this construction that portion of the carrier which is subjected to the most wear in normal use and which is most directly dependent upon the particular size and design of articles being manufactured, is made readily exchangeable with a suitable substitute therefore.

Referring to FIG. 5, the portion of actuating ring 70 in the immediate vicinity of the retaining slot 74 is shown in a partial detail breakout. To install gripping levers 64 through 68, the actuating ring is rotated to align slot 74 with a gripping lever accepting slot in chuck body 62 such as slot 65 of FIG. 3. The lever is then inserted, and the actuating ring 70 is rotated to move slot 74 out of alignment with the gripping lever. When all gripping levers have been thus installed, the actuating ring 70 is rotated to align slot 74 with the retaining pin hole 73 in chuck body 62 shown in FIGS. 2 and 4. The retaining pin is then inserted to restrain ring 70 against rotation relative to chuck body 62. The relative position of pin 72 and the article gripping levers is shown in FIGS. 2 and 4.

It will be appreciated by those skilled in the art that various arrangements of a number of article gripping levers and chuck body designs may be employed. It is not the intention of applicant to limit the scope of the present invention to any particular spatial arrangement of article gripping levers or any particular design of the chuck body at the article receiving end. Nor are the details of the rotation drive sprocket to be contrued as limitations, a suitable friction drive wheel or drive gear being acceptable substitutes. Further, while the invention has been illustrated in some detail, according to the preferred embodiment shown in the accompanying drawings and while the preferred illustrated embodiment has been described in some detail, there is no intention to thus limit the invention to such detail. On the contrary, it is intended to cover all modifications, alterations and equivalents falling within the spirit and scope of the appended claims.

What is claimed is:

1. An article carrier for use in a reheat and blow molding machine for forming a finished article from a thermoplastic article preform having a formable portion and a formed portion, the formable portion being expanded in a mold cavity of the molding machine by injection of an expansion fluid into the preform after adjusting the temperature thereof to the molecular orientation temperature, the carrier comprising:

(a) a carrier body;
 (b) a spindle rotatably supported within the carrier body and having a passage therethrough for admission of the expansion fluid;

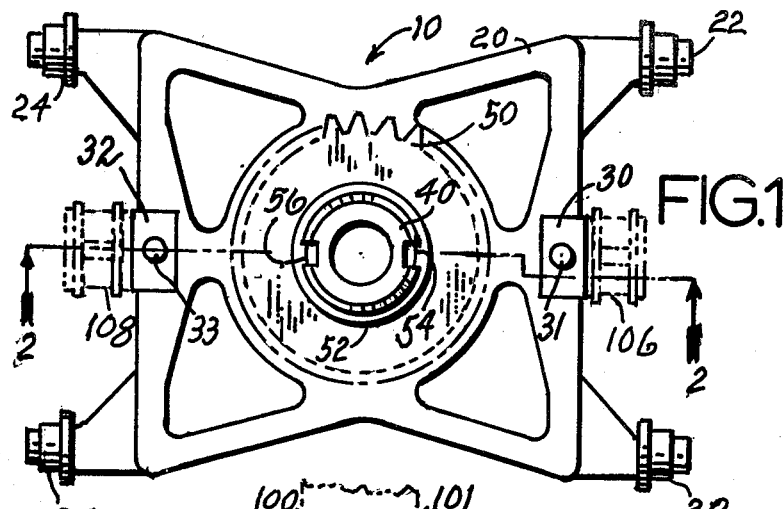
FIG.1
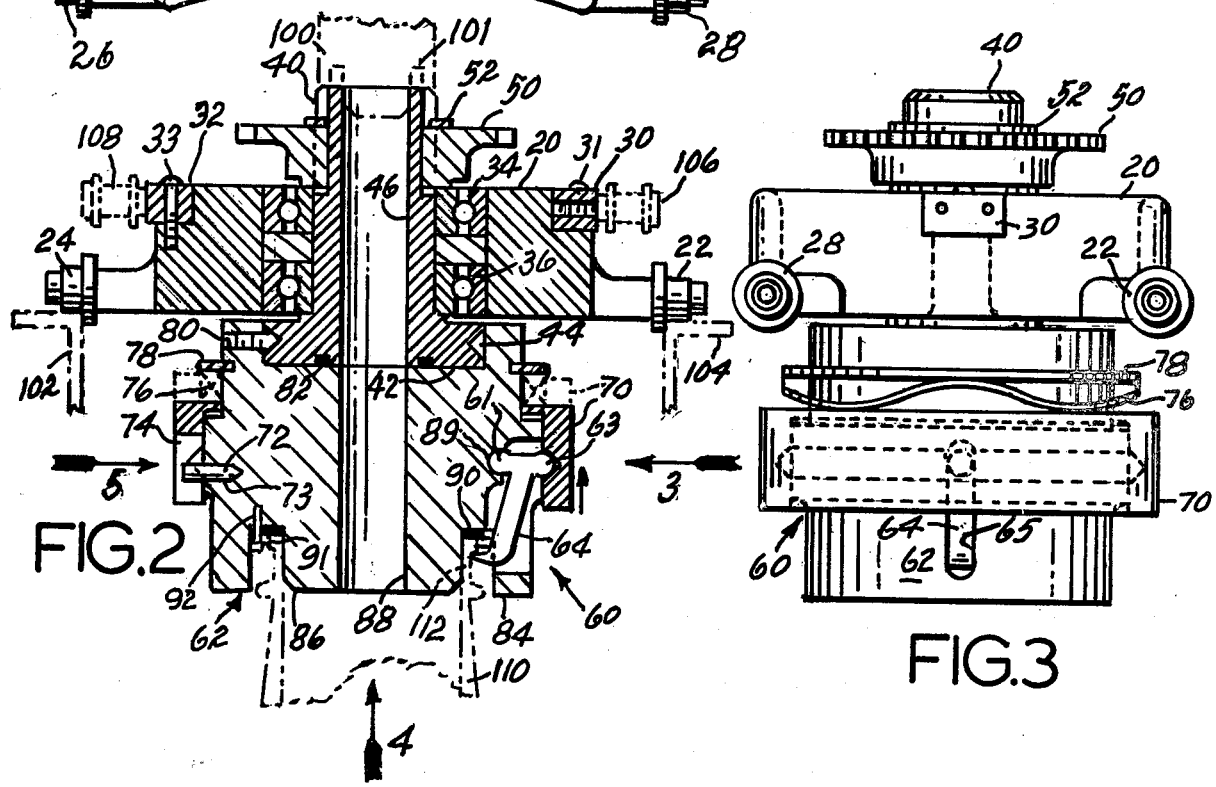
FIG.2
FIG.3
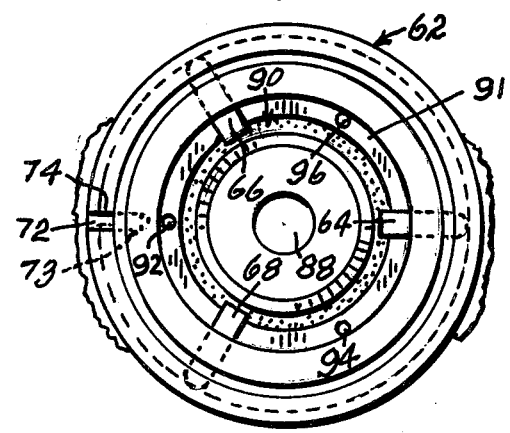
FIG.4
FIG.5